United States Patent
Li et al.

(10) Patent No.: US 12,164,531 B2
(45) Date of Patent: Dec. 10, 2024

(54) COMMUNICATION METHOD AND SYSTEM IMPLEMENTED BASED ON RECOGNIZED DATA, AND GAS-VOLUME CONVERSION CONTROLLER

(71) Applicant: Zhejiang Cangnan Instrument Group Co., Ltd., Wenzhou (CN)

(72) Inventors: Zhongyang Li, Wenzhou (CN); Haitang Lin, Wenzhou (CN); Xiangke Huang, Wenzhou (CN); Ming Huang, Wenzhou (CN); Xin Chen, Wenzhou (CN); Faqiao Chen, Wenzhou (CN)

(73) Assignee: Zhejiang Cangnan Instrument Group Co., Ltd., Wenzhou (CN)

( * ) Notice: Subject to any disclaimer, the term of this patent is extended or adjusted under 35 U.S.C. 154(b) by 118 days.

(21) Appl. No.: 18/064,076

(22) Filed: Dec. 9, 2022

(65) Prior Publication Data
US 2024/0045876 A1 Feb. 8, 2024

(30) Foreign Application Priority Data
Aug. 4, 2022 (CN) .......................... 202210932736.7

(51) Int. Cl.
| | |
|---|---|
| G06F 16/00 | (2019.01) |
| G06F 16/21 | (2019.01) |
| G06F 16/22 | (2019.01) |
| G06F 16/2457 | (2019.01) |
| G06Q 30/0201 | (2023.01) |
| G06Q 50/06 | (2012.01) |

(52) U.S. Cl.
CPC ...... *G06F 16/24578* (2019.01); *G06F 16/219* (2019.01); *G06F 16/2282* (2019.01); *G06Q 30/0206* (2013.01); *G06Q 50/06* (2013.01)

(58) Field of Classification Search
None
See application file for complete search history.

(56) References Cited

U.S. PATENT DOCUMENTS

2018/0314944 A1* 11/2018 Li ..................... G06Q 30/0241

FOREIGN PATENT DOCUMENTS

CN 112988043 A * 6/2021 .......... G06F 11/1068

* cited by examiner

*Primary Examiner* — Tuankhanh D Phan
(74) *Attorney, Agent, or Firm* — Stanek Lemon Crouse & Meeks PA

(57) ABSTRACT

The present disclosure provides a communication method and system implemented based on recognized data, and a gas-volume conversion controller. The method includes: obtaining an instantaneous value and a data archive; obtaining a historical data increment value data set by using a preset data increment model; sorting historical data increment values in the historical data increment value data set; storing an obtained data increment value sequence based on a preset time interval; generating recognized data from the historical data increment values based on a preset sorting sequence, an increment value data value, and a preset symmetric encryption algorithm model; and obtaining the recognized data, and parsing the recognized data to obtain a parsing result. Data is sorted by using a digital matrix and an increment. In this way, the data is effectively compressed, thereby reducing a data amount, and improving communication efficiency. A device user can perform self-service processing.

7 Claims, 5 Drawing Sheets

COMMUNICATION METHOD AND SYSTEM IMPLEMENTED BASED ON RECOGNIZED DATA, AND GAS-VOLUME CONVERSION CONTROLLER

CROSS REFERENCE TO RELATED APPLICATION

This patent application claims the benefit and priority of Chinese Patent Application No. 202210932736.7, filed with the China National Intellectual Property Administration on Aug. 4, 2022, the disclosure of which is incorporated by reference herein in its entirety as part of the present application.

TECHNICAL FIELD

The present disclosure relates to the field of data update technologies, and in particular, to a communication method and system implemented based on recognized data, and communication of a gas-volume conversion controller.

BACKGROUND

With the development of science and technology, many new communication modes are emerging in the communication field. During conventional communication of Internet of Things (IoT) data, a wireless or wired communication medium is usually required. Consequently, it not only causes massive data to be transmitted, but also adds to communication devices and costs, and besides, data is not accurate enough. In view of this, the present disclosure proposes a new communication method, so as to acquire data more conveniently, make real-time update, and transmit data in a securer manner.

SUMMARY

In view of disadvantages in the prior art, the present disclosure provides a communication method and system implemented based on recognized data, and an apparatus.

To solve the above technical problems, the present disclosure proposes the following technical solutions.

The present disclosure provides a communication method implemented based on recognized data, including the following steps:

obtaining an instantaneous value and a data archive;

obtaining a historical data increment value data set based on the instantaneous value and historical data in the data archive by using a preset data increment model;

sorting historical data increment values in the historical data increment value data set based on a preset sorting model by using digital matrix sorting, to obtain a data increment value sequence;

storing the obtained data increment value sequence based on a preset time interval;

generating recognized data from the historical data increment values based on a preset sorting sequence, an increment value data value, and a preset symmetric encryption algorithm model, where the recognized data includes header data and record data, the header data includes an Internet protocol (IP) address and a port of a preset server, a device unique identifier, and a function expression constant of the data increment model, and the record data is the instantaneous value and the historical data; and obtaining the recognized data, and parsing the recognized data to obtain a parsing result.

In a possible implementation, the instantaneous value and the historical data separately include a time, a primary volume, a base volume, a flow, a base flow, a temperature, a pressure, a cumulative gas purchase volume, a unit price, and a remaining volume, which are separately sorted based on the same preset sorting model.

In a possible implementation, the preset data increment model generates a corresponding function expression by fitting original values in the real-time data and the historical data, and the function expression is as follows:

$$f(x) = a_n x^n \sin x + a_{n-1} x^{n-1} \sin x + \cdots + a_1 x \sin x + a_0 \sin x + bx \cdot \arctan x + c = \sum_{i=0}^{n} a_i x^i \sin x + bx \cdot \arctan x + c,$$

where $a_i$ is a constant, $i=0, 1, 2, \ldots, n$, b, and c are also constants, $f(x)$ is a calculated value of a data fitting function relationship expression of a data item at a time point x, that is, a data fitting value, and x represents a time point; and $f_g(x)$ represents a data fitting value of the primary volume at the time point x, $f_b(x)$ represents a data fitting value of the base volume at the time point x, $f_t(x)$ represents a data fitting value of the cumulative gas purchase volume at the time point x, $f_s(x)$ represents a data fitting value of the remaining volume at the time point x, $d(x)$ represents an increment value of a data item, that is, a difference between an actual value at the time point x and the data fitting value $f(x)$, $d_g(x)$ represents a difference between an actual value of the primary volume at the time point x and the data fitting value $f_g(x)$, $d_b(x)$ represents a difference between an actual value of the cumulative gas purchase volume at the time point x and the data fitting value $f_b(x)$, $d_t(x)$ represents a difference between an actual value of the cumulative gas purchase volume at the time point x and the data fitting value $f_t(x)$, and $d_s(x)$ represents a difference between an actual value of the cumulative gas purchase volume at the time point x and the data fitting value $f_s(x)$.

In a possible implementation, the preset data increment model generates a corresponding function expression by fitting original values in the real-time data and the historical data, and the function expression is as follows:

$$y(x) = b_m x^m \cos x + b_{m-1} x^{m-1} \cos x + \cdots + b_1 x \cos x + b_0 x \cos x + cx + d = \sum_{j=0}^{m} b_j x^j \cos x + cx + d,$$

where $b_j$ is a constant, $j=0, 1, 2, \ldots, m$, c and d are also constants, and b of each data item and values of c and d are also different; $y(x)$ is a calculated value of a data fitting function relationship expression of a data item at a time point x, that is, a data fitting value, x represents a time point, $y_v(x)$, $y_u(x)$, $y_t(x)$, $y_p(x)$, and $y_j(x)$ represents a time point, respectively are data fitting values of a flow, a base flow, a temperature, a pressure, and a unit price, $d(x)$ is also used to represent increment values of a flow, a base flow, a temperature, a pressure, and a unit price of a data item, that is, a difference between an actual value at the time point x and a data increment value y(x) and $d_v(x)$, $d_u(x)$, $d_t(x)$, $d_p(x)$, and $d_j(x)$ represent increment values of a flow, a base flow, a temperature, a pressure, and a unit price at the time point x.

In a possible implementation, the data increment value sequence is: a time increment value, an increment value of a primary volume, an increment value of a base volume, an increment value of a flow, an increment value of a base flow, a temperature increment value, a pressure increment value, an increment value of a cumulative gas purchase volume, a unit price increment value, and a remaining volume increment value, where pairs of increment values are separated by a first delimiter, and increment values of pairs of time points are separated by a second delimiter.

In a possible implementation, the method further includes a verification step and an encryption step, specifically:

performing a check operation on historical data in the recognized data by using any one of sum check and cyclic redundancy check (CRC); and encrypting the device unique identifier, the function expression constant of the data increment model, the instantaneous value, a check value of the historical data, a timestamp, and a digital signature by using a symmetric encryption algorithm, where the symmetric encryption algorithm is any one of a data encryption standard (DES), a triple data encryption standard (3DES), shangyong *mima* 4 (SM4), an advanced encryption standard (AES), Rivest Cipher 2 (RC2), and Rivest Cipher 4 (RC4).

In a possible implementation, a sorting sequence of the recognized data includes:

the recognized data=the IP address and the port of the server+an identification code of the symmetric encryption algorithm+a block of encrypted data+a digital matrix of the historical data, and is separated by a third delimiter; and the block of encrypted data=the device unique identifier+the function expression constant of the data increment model+the real-time data+a check value of the historical data+a timestamp+a digital signature, and is separated by a fourth delimiter.

In a possible implementation, the obtaining the recognized data, and parsing the recognized data to obtain a parsing result includes the following steps:

obtaining the recognized data, and decoding and storing the recognized data based on a preset storage rule and a preset algorithm; and performing an inverse operation on the historical data increment values according to an increment value rule, to obtain the historical data and the instantaneous value, and using the instantaneous value to settle gas consumption and generate a payment volume for self-service payment.

The present disclosure further provides a communication system implemented based on recognized data, including a first device and a data obtaining and analysis device, where the first device includes a data obtaining module, an increment value calculation module, a sorting module, a storage module, and a data generation module;

the data obtaining module is configured to obtain an instantaneous value and a data archive;

the increment value calculation module is configured to obtain a historical data increment value data set based on the instantaneous value and historical data in the data archive by using a preset data increment model;

the sorting module is configured to sort historical data increment values in the historical data increment value data set based on a preset sorting model by using digital matrix sorting, to obtain a data increment value sequence;

the storage module is configured to store the obtained data increment value sequence based on a preset time interval;

the data generation module is configured to generate recognized data from the historical data increment values based on a preset sorting sequence, an increment value data value, and a preset symmetric encryption algorithm model, where the recognized data includes header data and record data, the header data includes an IP address and a port of a preset server, a device unique identifier, and a function expression constant of the data increment model, and the record data is the instantaneous value and the historical data; and the data obtaining and analysis device is configured to obtain the recognized data, and parse the recognized data to obtain a parsing result.

A gas-volume conversion controller includes a data obtaining module, an increment value calculation module, a sorting module, a storage module, and a data generation module, where the data obtaining module is configured to obtain an instantaneous value and a data archive;

the increment value calculation module is configured to obtain a historical data increment value data set based on the instantaneous value and historical data in the data archive by using a preset data increment model;

the sorting module is configured to sort historical data increment values in the historical data increment value data set based on a preset sorting model by using digital matrix sorting, to obtain a data increment value sequence;

the storage module is configured to store the obtained data increment value sequence based on a preset time interval; and the data generation module is configured to generate recognized data from the historical data increment values based on a preset sorting sequence, an increment value data value, and a preset symmetric encryption algorithm model, where the recognized data includes header data and record data, the header data includes an IP address and a port of a preset server, a device unique identifier, and a function expression constant of the data increment model, and the record data is the instantaneous value and the historical data.

The present disclosure has significant technical effects due to adoption of the foregoing technical solutions:

According to the method in the present disclosure, the gas-volume conversion controller implements IoT communication.

The recognized data includes two parts. The historical data is in a digital matrix format, and is transmitted by using an increment value.

The increment value in a historical value is used. That is, a data transmission amount is compressed, which reduces a data amount. Further, a value of a data item is converted, which hides an actual value of the data item, performs encryption, and ensures data security. An encryption mode of a special data format is sampled. Data is sorted by using a digital matrix and an increment. In this way, the data is effectively compressed, thereby reducing a data amount, and improving communication efficiency.

A device user can perform self-service processing. This improves convenience and reduces workload of a gas company, and improves working efficiency and economic benefits of the gas company.

The real-time data is encrypted, the increment value in the historical data is used, and a check code of the historical data is encrypted. This not only ensures data security and privacy, but also reduces an amount of encrypted data, which ensures data generation, decoding efficiency, and a running speed.

The data adopts a check algorithm and encryption processing, and the timestamp, to prevent an error code and tampering and perform encryption protection. This ensures data security.

BRIEF DESCRIPTION OF THE DRAWINGS

To describe the technical solutions in the embodiments of the present disclosure or in the prior art more clearly, the accompanying drawings required for describing the embodiments or the prior art will be described briefly below. Apparently, the accompanying drawings in the following description show some embodiments of the present disclosure, and a person of ordinary skill in the art may still derive other drawings from these accompanying drawings without creative efforts.

DETAILED DESCRIPTION OF THE EMBODIMENTS

The following further describes the present disclosure in detail with reference to the embodiments. The following embodiments are used to explain the present disclosure, but the present disclosure is not limited to the following embodiments.

Embodiment 1

Figure 1:
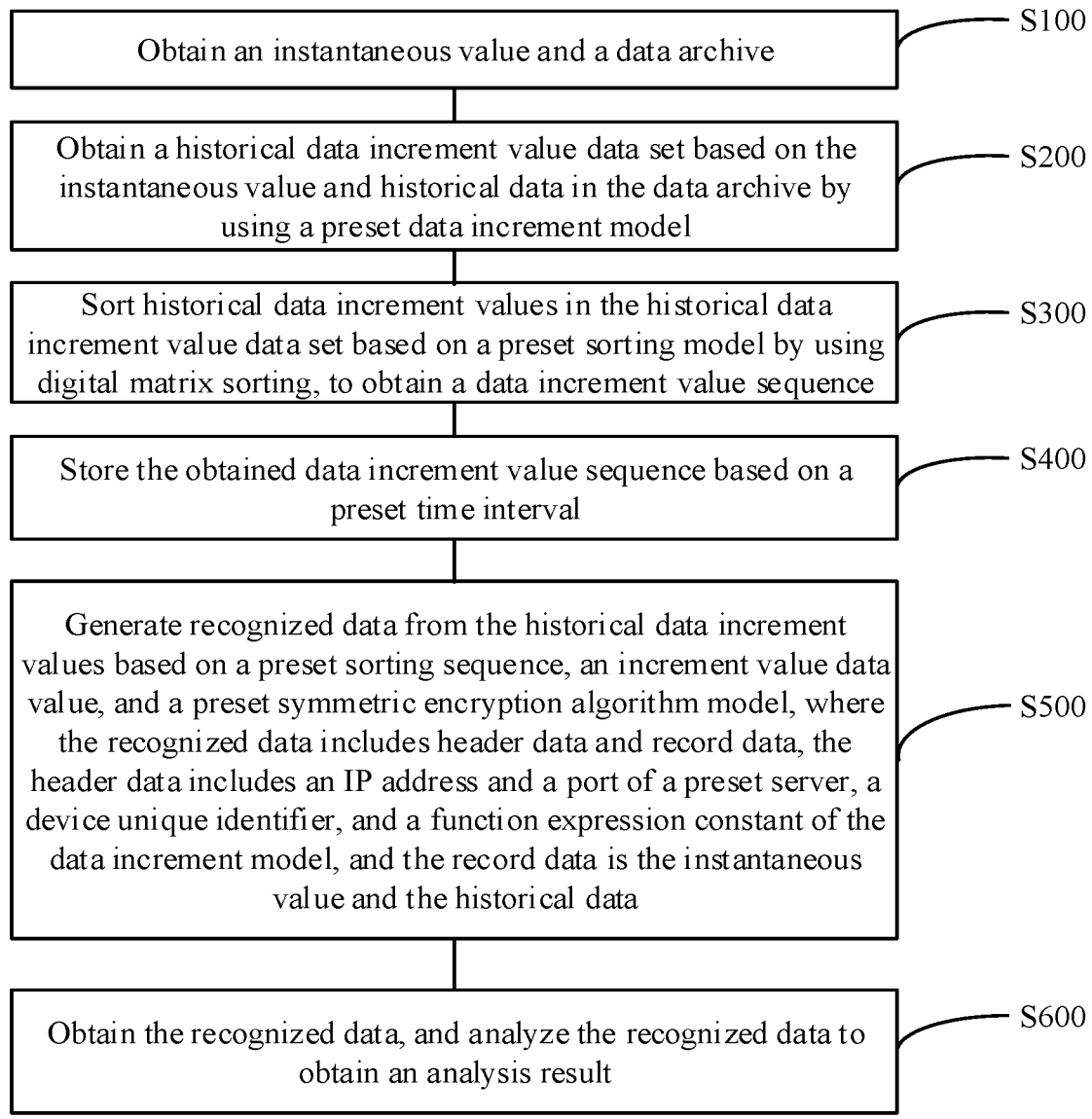
FIG. 1 is a schematic flowchart of a method according to the present disclosure.

A communication method implemented based on recognized data, as shown in FIG. 1, includes the following steps:

S100. Obtain an instantaneous value and a data archive.

S200. Obtain a historical data increment value data set based on the instantaneous value and historical data in the data archive by using a preset data increment model.

S300. Sort historical data increment values in the historical data increment value data set based on a preset sorting model by using digital matrix sorting, to obtain a data increment value sequence.

S400. Store the obtained data increment value sequence based on a preset time interval.

S500. Generate recognized data from the historical data increment values based on a preset sorting sequence, an increment value data value, and a preset symmetric encryption algorithm model, where the recognized data includes header data and record data, the header data includes an IP address and a port of a preset server, a device unique identifier, and a function expression constant of the data increment model, and the record data is the instantaneous value and the historical data.

5600. Obtain the recognized data, and parse the recognized data to obtain a parsing result.

In the present disclosure, the recognized data includes two parts. The historical data is in a digital matrix format, and is transmitted by using an increment value.

The increment value in a historical value is used. That is, a data transmission amount is compressed, which reduces a data amount. Further, a value of a data item is converted, which hides an actual value of the data item, performs encryption, and ensures data security. An encryption mode of a special data format is sampled. Data is sorted by using a digital matrix and an increment. In this way, the data is effectively compressed, thereby reducing a data amount, and improving communication efficiency.

Specifically, the instantaneous value and the historical data separately include a time, a primary volume, a base volume, a flow, a base flow, a temperature, a pressure, a cumulative gas purchase volume, a unit price, and a remaining volume, which are separately sorted based on the same preset sorting model. Actually, the historical data in the data archive is also sorted based on a moment rather than disorderly. A time for obtaining may be set by a user, or may be set according to a usage rule, for example, one minute, ten minutes, or one hour. More precisely, acquisition may be performed per second. After acquisition, sorting is performed based on a set sequence. This is equivalent to that there are so many kinds of data items at each moment. In an embodiment, the device unique identifier is actually a unique identifier of a gas-volume conversion controller.

In an embodiment, the preset data increment model generates a corresponding function expression by fitting original values in the real-time data and the historical data (including the primary volume, the base volume, the cumulative gas purchase volume, and the remaining volume). The function expression is Formula 1:

$$f(x) = a_n x^n \sin x + a_{n-1} x^{n-1} \sin x + \cdots + a_1 x \sin x + a_0 \sin x + bx \cdot \arctan x + c = \sum_{i=0}^{n} a_i x^i \sin x + bx \cdot \arctan x + c, \text{ where}$$

Figure 2:
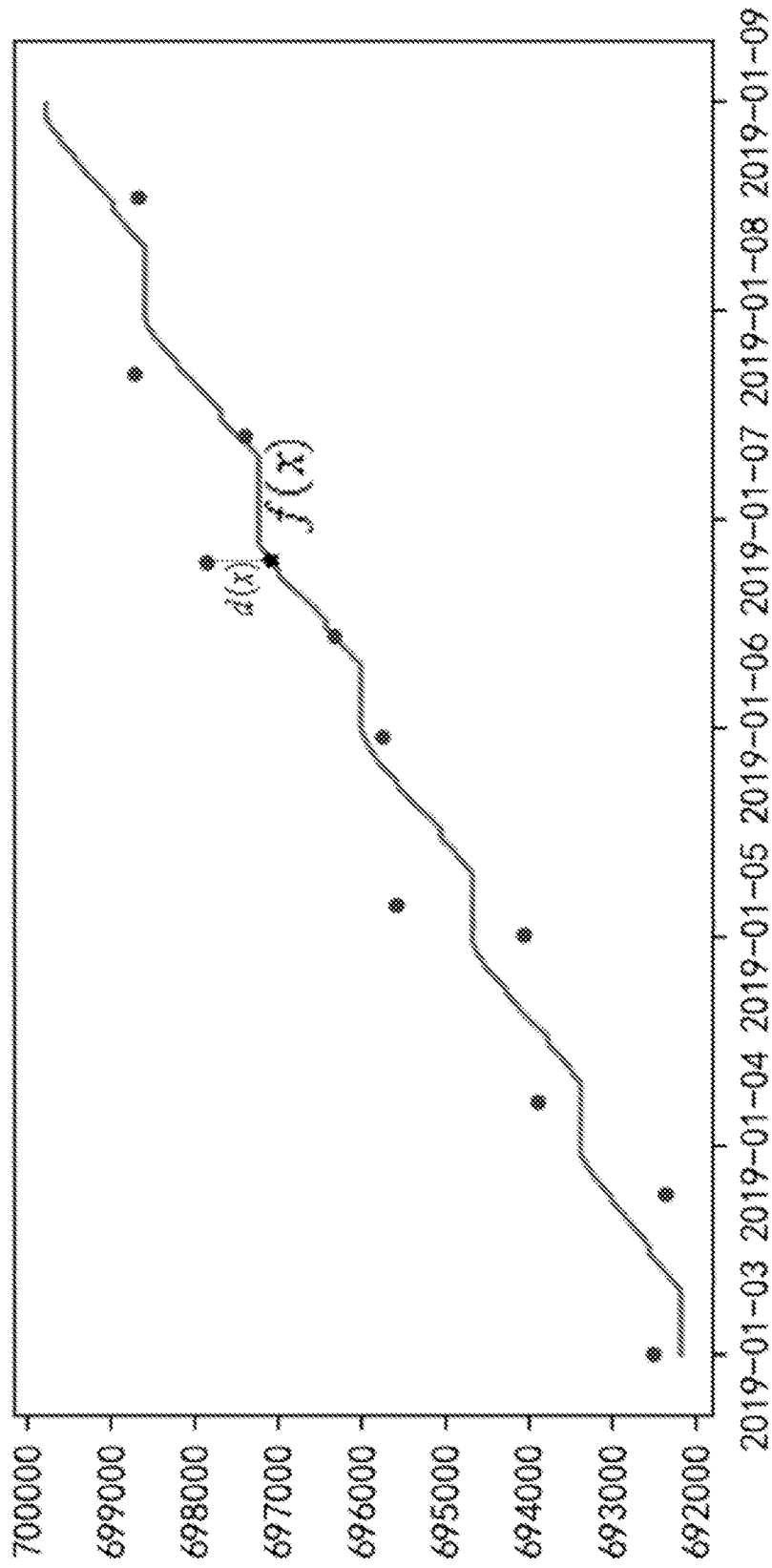
FIG. 2 is a schematic diagram of increment values of a function relationship expression of a cumulative amount data item in historical data.

$a_i$ is a constant, i=0, 1, 2, ..., n, b, and c are also constants, f(x) is a calculated value of a data fitting function relationship expression of a data item at a time point x, that is, a data fitting value, and x represents a time point; and $f_g(x)$ represents a data fitting value of the primary volume at the time point x, $f_b(x)$ represents a data fitting value of the base volume at the time point x, $f_l(x)$ represents a data fitting value of the cumulative gas purchase volume at the time point x, $f_s(x)$ represents a data fitting value of the remaining volume at the time point x, d(x) represents an increment value of a data item, that is, a difference between an actual value at the time point x and the data fitting value f(x), $d_g(x)$ represents a difference between an actual value of the primary volume at the time point x and the data fitting value $f_g(x)$, $d_b(x)$ represents a difference between an actual value of the cumulative gas purchase volume at the time point x and the data fitting value $f_b(x)$, $d_l(x)$ represents a difference between an actual value of the cumulative gas purchase volume at the time point x and the data fitting value $f_t(x)$, and $d_s(x)$ represents a difference between an actual value of the cumulative gas purchase volume at the time point x and the data fitting value $f_s(x)$. A schematic diagram is obtained in this manner. As shown in FIG. 2, a curve is a fitting curve of working condition cumulative data, where dots represent real data values, a five-pointed star represents a relationship value that is of f (x) at the time point x and that is calculated based on data fitting of Formula 1, and d(x) represents a difference between a real value of the primary volume at the time point x and the data fitting value f(x).

Figure 3:
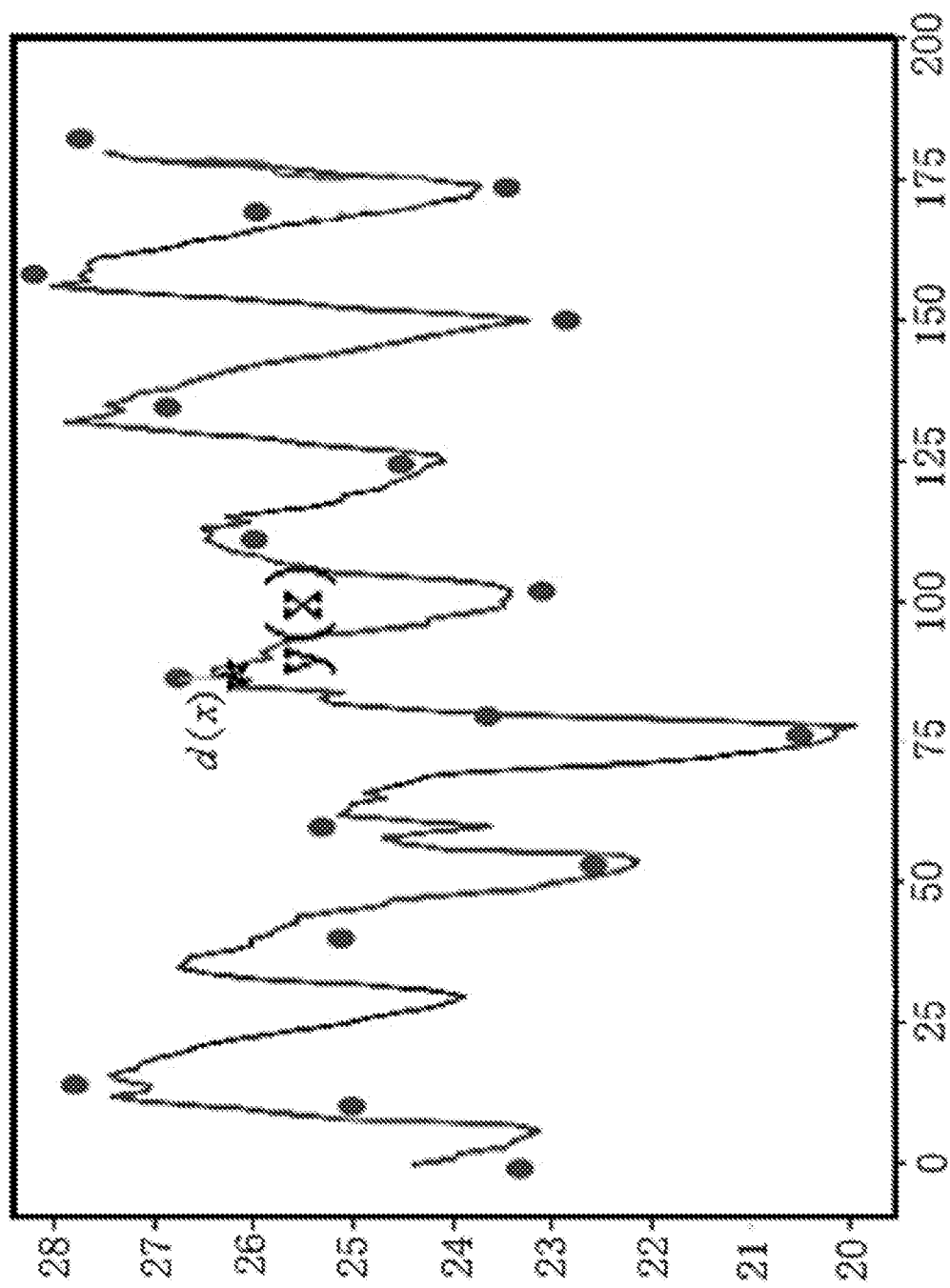
FIG. 3 is a schematic diagram of increment values of a function relationship expression of an instantaneous flow rate data item in historical data.

In addition, the function expression in this embodiment may also be used for calculation. The function expression is Formula 2:

$$y(x) = b_m x^m \cos x + b_{m-1} x^{m-1} \cos x + \cdots + b_1 x \cos x + b_0 x \cos x + cx + d = \sum_{j=0}^{m} b_j x^j \cos x + cx + d,$$

where $b_j$ is a constant, j=0, 1, 2, . . . , m, c and d are also constants, and $b_j$ of each data item and values of c and d are also different; y(x) is a calculated value of a data fitting function relationship expression of a data item at a time point x, that is, a data fitting value, x represents a time point, $y_v(x)$, $y_u(x)$, $y_t(x)$, $y_p(x)$, and $y_j(x)$ represents a time point, respectively are data fitting values of a flow, a base flow, a temperature, a pressure, and a unit price, d(x) is also used to represent increment values of a flow, a base flow, a temperature, a pressure, and a unit price of a data item, that is, a difference between an actual value at the time point x and a data increment value y(x), and $d_v(x)$, $d_u(x)$, $d_t(x)$, $d_p(x)$, and $d_j(x)$ represent increment values of a flow, a base flow, a temperature, a pressure, and a unit price at the time point x. As shown in FIG. 3, a blue curve is a data fitting curve of temperatures, red dots represent real data values, and a black five-pointed star represents a relationship value that is of y(x) at the time point x and that is calculated based on data fitting of Formula 2, and d(x) represents a difference between a real value of the temperature at the time point x and the data fitting value y(x).

In a possible implementation, the data increment value sequence is: a time increment value, an increment value of a primary volume, an increment value of a base volume, an increment value of a flow, an increment value of a base flow, a temperature increment value, a pressure increment value, an increment value of a cumulative gas purchase volume, a unit price increment value, and a remaining volume increment value, where pairs of increment values are separated by a first delimiter, and increment values of pairs of time points are separated by a second delimiter.

For example, if the first delimiter is a comma and the second delimiter is a semicolon, $x_1, d_g(x)_1, d_b(x)_1, d_v(x)_1, d_t(x)_1, d_p(x)_1, d_n(x)_1, d_j(x)_1, d_s(x)_1;$ $x_2, d_g(x)_2, d_b(x)_2, d_v(x)_2, d_t(x)_2, d_p(x)_2, d_1(x)_2, d_j(x)_2, d_s(x)_2;$

⋮

$x_n, d_g(x)_n, d_b(x)_n, d_v(x)_n, d_t(x)_n, d_p(x)_n, d_n(x)_n, d_j(x)_n, d_s(x)_n;$

To make the data more secure, the method further includes a verification step and an encryption step, specifically:

performing a check operation on historical data in the recognized data by using any one of sum check or CRC; and encrypting the device unique identifier, the function expression constant of the data increment model, the instantaneous value, a check value of the historical data, a timestamp, and a digital signature by using a symmetric encryption algorithm, where the symmetric encryption algorithm is any one of a DES, a 3DES, SM4, an AES, RC2, and RC4.

Therefore, a device user can perform self-service processing. This improves convenience and reduces workload of a gas company, and improves working efficiency and economic benefits of the gas company. The real-time data is encrypted, the increment value in the historical data is used, and a check code of the historical data is encrypted. This not only ensures data security and privacy, but also reduces an amount of encrypted data, which ensures data generation, decoding efficiency, and a running speed. The data adopts a check algorithm and encryption processing, and the timestamp, to prevent an error code and tampering and perform encryption protection. This ensures data security.

In an embodiment, a sorting sequence of the recognized data includes:

the recognized data=the IP address and the port of the server+an identification code of the symmetric encryption algorithm+a block of encrypted data+a digital matrix of the historical data, and is separated by a third delimiter; and the block of encrypted data=the device unique identifier+the function expression constant of the data increment model+the real-time data+a check value of the historical data+a timestamp+a digital signature, and is separated by a fourth delimiter.

In addition, the obtaining the recognized data, and parsing the recognized data to obtain a parsing result includes the following steps:

obtaining the recognized data, and decoding and storing the recognized data based on a preset storage rule and a preset algorithm; and performing an inverse operation on the historical data increment values according to an increment value rule, to obtain the historical data and the instantaneous value, and using the instantaneous value to settle gas consumption and generate a payment volume for self-service payment.

In all the foregoing embodiments, the recognized data may be represented in a two-dimensional code form, or may be in another form.

Embodiment 2

Figure 4:
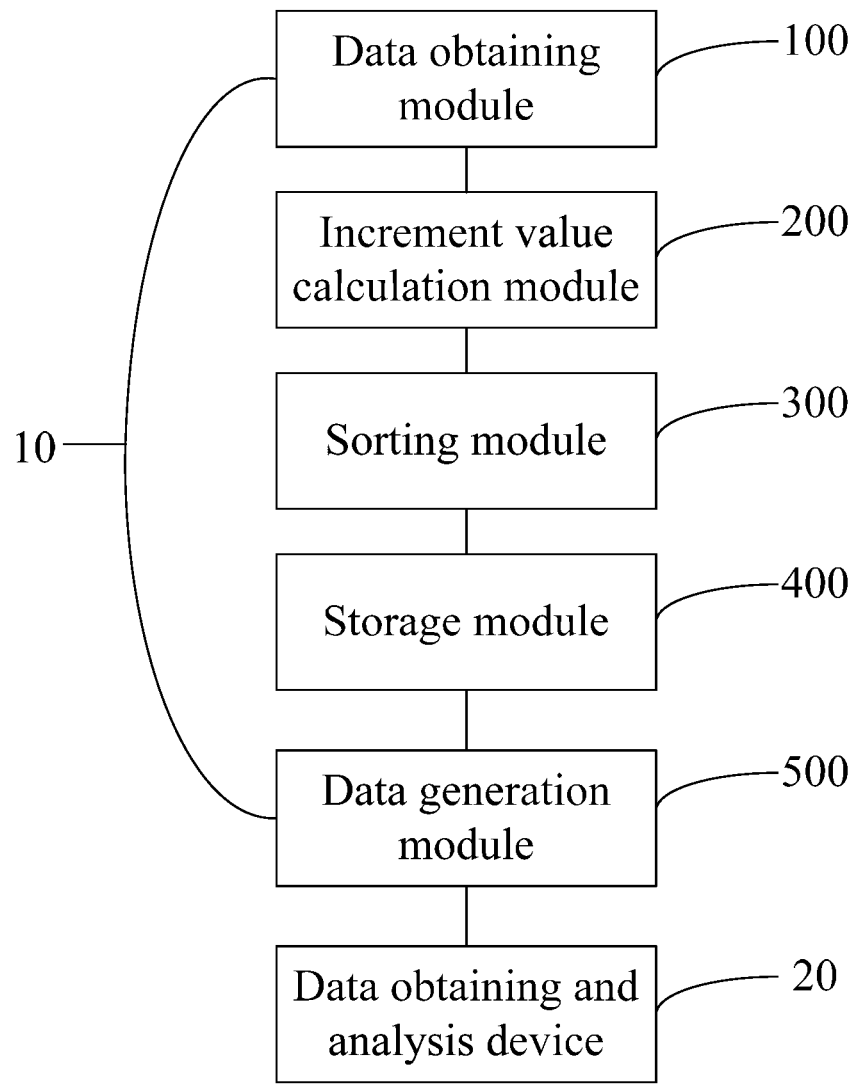
FIG. 4 is a schematic diagram of functional modules in a communication system implemented based on recognized data.

A communication system implemented based on recognized data, as shown in FIG. 4, includes a first device 10 and a data obtaining and analysis device 20, where the first device includes a data obtaining module 100, an increment value calculation module 200, a sorting module 300, a storage module 400, and a data generation module 500.

The data obtaining module 100 is configured to obtain an instantaneous value and a data archive.

The increment value calculation module 200 is configured to obtain a historical data increment value data set based on the instantaneous value and historical data in the data archive by using a preset data increment model.

The sorting module 300 is configured to sort historical data increment values in the historical data increment value data set based on a preset sorting model by using digital matrix sorting, to obtain a data increment value sequence.

The storage module 400 is configured to store the obtained data increment value sequence based on a preset time interval.

The data generation module 500 is configured to generate recognized data from the historical data increment values based on a preset sorting sequence, an increment value data value, and a preset symmetric encryption algorithm model, where the recognized data includes header data and record data, the header data includes an IP address and a port of a preset server, a device unique identifier, and a function expression constant of the data increment model, and the record data is the instantaneous value and the historical data.

The data obtaining and analysis device 20 is configured to obtain the recognized data, and parse the recognized data to obtain a parsing result.

Embodiment 3

Figure 5:
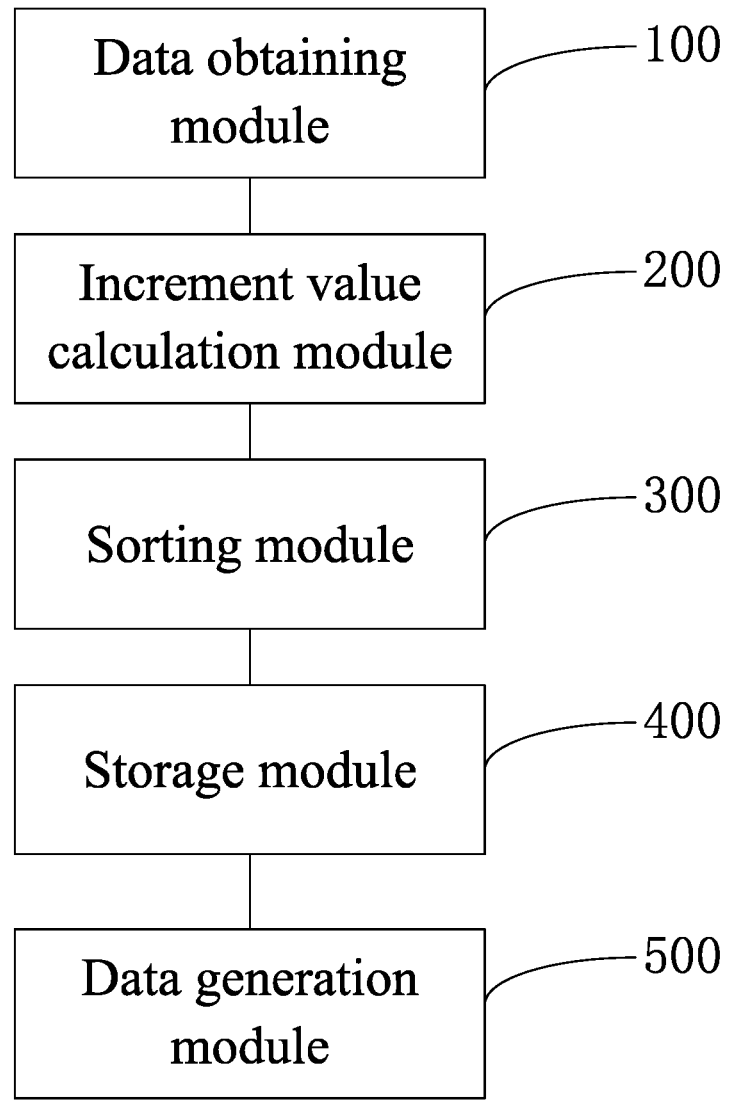
FIG. 5 is a schematic diagram of data modules in a gas-volume conversion controller.

A gas-volume conversion controller, as shown in FIG. 5, includes a data obtaining module 100, an increment value calculation module 200, a sorting module 300, a storage module 400, and a data generation module 500.

The data obtaining module 100 is configured to obtain an instantaneous value and a data archive.

The increment value calculation module 200 is configured to obtain a historical data increment value data set based on the instantaneous value and historical data in the data archive by using a preset data increment model.

The sorting module 300 is configured to sort historical data increment values in the historical data increment value data set based on a preset sorting model by using digital matrix sorting, to obtain a data increment value sequence.

The storage module 400 is configured to store the obtained data increment value sequence based on a preset time interval.

The data generation module 500 is configured to generate recognized data from the historical data increment values based on a preset sorting sequence, an increment value data value, and a preset symmetric encryption algorithm model, where the recognized data includes header data and record data, the header data includes an IP address and a port of a preset server, a device unique identifier, and a function expression constant of the data increment model, and the record data is the instantaneous value and the historical data.

The embodiments of this specification are described in a progressive manner, and each embodiment focuses on differences from other embodiments. The same or similar parts between the embodiments may refer to each other.

Persons skilled in the art should understand that the embodiments of the present disclosure may be provided as a method, an apparatus, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a magnetic disk memory, a CD-ROM, an optical memory, and the like) that include computer-usable program code.

The present disclosure is described with reference to the flowcharts and/or block diagrams of the method, the terminal device (system), and the computer program product according to the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing terminal device to generate a machine, so that the instructions executed by the computer or the processor of another programmable data processing terminal device generate an apparatus for implementing a specific function in one or more processes in the flowcharts and/or in one or more blocks in the block diagrams.

These computer program instructions may also be stored in a computer readable memory that can indicate the computer or the another programmable data processing terminal device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto the computer or the another programmable data processing terminal device, so that a series of operations and steps are performed on the computer or the another programmable terminal device, thereby generating computer-implemented processing. Therefore, the instructions executed on the computer or the another programmable terminal device provide steps for implementing a specific function in one or more processes in the flowcharts and/or in one or more blocks in the block diagrams.

It should be Noted the Following:

The term "an embodiment" or "embodiments" referred to in the specification means that a specific feature, structure or characteristic described in connection with the embodiments is included in at least one embodiment of the present disclosure. Therefore, the phrase "an embodiment" or "embodiments" that appears everywhere throughout the specification does not necessarily refer to the same embodiment.

In addition, it should be noted that specific embodiments described in this specification may be different from shapes and names of parts and components thereof. Any equivalent or simple change in construction, features, and principles described in the patent concept of the present disclosure is included in the patent protection scope of the present disclosure. Persons skilled in the art can make various modifications or supplements to the specific embodiments described or replacement in a similar manner, which should fall within the protection scope of the present disclosure, as long as they do not depart from the structure of the present disclosure or go beyond the scope as defined in the claims.

What is claimed is:

1. A communication method implemented based on recognized data, comprising the following steps:
    obtaining an instantaneous value and a data archive;
    obtaining a historical data increment value data set based on the instantaneous value and historical data in the data archive by using a preset data increment model;

sorting historical data increment values in the historical data increment value data set based on a preset sorting model by using digital matrix sorting, to obtain a data increment value sequence;

storing the obtained data increment value sequence based on a preset time interval;

generating recognized data from the historical data increment values based on a preset sorting sequence, an increment value data value, and a preset symmetric encryption algorithm model, wherein the recognized data comprises header data and record data, the header data comprises an Internet protocol (IP) address and a port of a preset server, a device unique identifier, and a function expression constant of the data increment model, and the record data is the instantaneous value and the historical data; and obtaining the recognized data, and parsing the recognized data to obtain a parsing result;

wherein the instantaneous value and the historical data separately comprise a time, a primary volume, a base volume, a flow, a base flow, a temperature, a pressure, a cumulative gas purchase volume, a unit price, and a remaining volume, which are separately sorted based on the same preset sorting model;

wherein the preset data increment model generates a corresponding function expression by fitting original values in the real-time data and the historical data, and the function expression is as follows:

$$f(x) = a_n x^n \sin x + a_{n-1} x^{n-1} \sin x + \ldots + a_1 x \sin x + a_0 \sin x + bx \cdot \arctan x + c = \sum_{i=0}^{n} a_i x^i \sin x + bx \cdot \arctan x + c,$$

wherein $a_i$ is a constant, $i=0, 1, 2 \ldots n$, b, and c are also constants, $f(x)$ is a calculated value of a data fitting function relationship expression of a data item at a time point x, that is, a data fitting value, and x represents a time point; and $f_g(x)$ represents a data fitting value of the primary volume at the time point x, $f_b(x)$ represents a data fitting value of the base volume at the time point x, $f_f(x)$ represents a data fitting value of the cumulative gas purchase volume at the time point x, $f_s(x)$ represents a data fitting value of the remaining volume at the time point x, $d(x)$ represents an increment value of a data item, that is, a difference between an actual value at the time point x and the data fitting value $f(x)$, $d_g(x)$ represents a difference between an actual value of the primary volume at the time point x and the data fitting value $f_g(x)$, $d_b(x)$ represents a difference between an actual value of the cumulative gas purchase volume at the time point x and the data fitting value $f_b(x)$, $d_f(x)$ represents a difference between an actual value of the cumulative gas purchase volume at the time point x and the data fitting value $f_f(x)$, and $d_s(x)$ represents a difference between an actual value of the cumulative gas purchase volume at the time point x and the data fitting value $f_s(x)$.

2. The communication method implemented based on recognized data according to claim 1, wherein the preset data increment model generates a corresponding function expression by data fitting the real-time data and an original value of the historical data, and the function expression is as follows:

$$y(x) = b_m x^m \cos x + b_{m-1} x^{m-1} \cos x + \cdots + b_1 x \cos x + b_0 x \cos x + cx + d = \sum_{j=0}^{m} b_j x^j \cos x + cx + d,$$

wherein $b_j$ is a constant, $j=0, 1, 2, \ldots, m$, c and d are also constants, and $b_j$ of each data item and values of c and d are also different; $y(x)$ is a calculated value of a data fitting function relationship expression of a data item at a time point x, that is, a data fitting value, x represents a time point, $y_v(x)$, $y_u(x)$, $y_t(x)$, $y_p(x)$, and $y_j(x)$ respectively are data fitting values of a flow, a base flow, a temperature, a pressure, and a unit price, $d(x)$ is also used to represent increment values of a flow, a base flow, a temperature, a pressure, and a unit price of a data item, that is, a difference between an actual value at the time point x and a data increment value $y(x)$, and $d_v(x)$, $d_u(x)$, $d_t(x)$, $d_p(x)$, and $d_j(x)$ represent increment values of a flow, a base flow, a temperature, a pressure, and a unit price at the time point x.

3. The communication method implemented based on recognized data according to claim 1, wherein the data increment value sequence is: a time increment value, an increment value of a primary volume, an increment value of a base volume, an increment value of a flow, an increment value of a base flow, a temperature increment value, a pressure increment value, an increment value of a cumulative gas purchase volume, a unit price increment value, and a remaining volume increment value, wherein pairs of increment values are separated by a first delimiter, and increment values of pairs of time points are separated by a second delimiter.

4. The communication method implemented based on recognized data according to claim 1, further comprising a verification step and an encryption step, specifically:

performing a check operation on historical data in the recognized data by using any one of sum check and cyclic redundancy check (CRC); and encrypting the device unique identifier, the function expression constant of the data increment model, the instantaneous value, a check value of the historical data, a timestamp, and a digital signature by using a symmetric encryption algorithm, wherein the symmetric encryption algorithm is any one of a data encryption standard (DES), a triple data encryption standard (3DES), shangyong *mima* 4 (SM4), an advanced encryption standard (AES), Rivest Cipher 2 (RC2), and Rivest Cipher 4 (RC4).

5. The communication method implemented based on recognized data according to claim 1, wherein a sorting sequence of the recognized data comprises:

the recognized data=the IP address and the port of the server+an identification code of the symmetric encryption algorithm+a block of encrypted data+a digital matrix of the historical data, which are separated by a third delimiter; and the block of encrypted data=the device unique identifier+ the function expression constant of the data increment model+the real-time data+a check value of the historical data+a timestamp+a digital signature, which are separated by a fourth delimiter.

6. The communication method implemented based on recognized data according to claim 1, wherein the obtaining the recognized data, and parsing the recognized data to obtain a parsing result comprises the following steps:

obtaining the recognized data, and decoding and storing the recognized data based on a preset storage rule and a preset algorithm; and performing an inverse operation on the historical data increment values according to an increment value rule, to obtain the historical data and the instantaneous value, and using the instantaneous value to settle gas consumption and generate a payment volume for self-service payment.

7. A communication system implemented based on recognized data, comprising a first device and a data obtaining and analysis device, wherein the first device comprises a data obtaining module, an increment value calculation module, a sorting module, a storage module, and a data generation module;

the data obtaining module is configured to obtain an instantaneous value and a data archive;

the increment value calculation module is configured to obtain a historical data increment value data set based on the instantaneous value and historical data in the data archive by using a preset data increment model;

the sorting module is configured to sort historical data increment values in the historical data increment value data set based on a preset sorting model by using digital matrix sorting, to obtain a data increment value sequence;

the storage module is configured to store the obtained data increment value sequence based on a preset time interval;

the data generation module is configured to generate recognized data from the historical data increment values based on a preset sorting sequence, an increment value data value, and a preset symmetric encryption algorithm model, wherein the recognized data comprises header data and record data, the header data comprises an IP address and a port of a preset server, a device unique identifier, and a function expression constant of the data increment model, and the record data is the instantaneous value and the historical data; and the data obtaining and analysis device is configured to obtain the recognized data, and parse the recognized data to obtain a parsing result;

wherein the instantaneous value and the historical data separately comprise a time, a primary volume, a base volume, a flow, a base flow, a temperature, a pressure, a cumulative gas purchase volume, a unit price, and a remaining volume, which are separately sorted based on the same preset sorting model;

wherein the preset data increment model generates a corresponding function expression by fitting original values in the real-time data and the historical data, and the function expression is as follows:

$$f(x) = a_n x^n \sin x + a_{n-1} x^{n-1} \sin x + \cdots + a_1 x \sin x + a_0 \sin x + bx \cdot \arctan x + c = \sum_{i=0}^{n} a_i x^i \sin x + bx \cdot \arctan x + c, \text{wherein.}$$

* * * * *